H. E. KNOWLES.
SPRING SEAT.
APPLICATION FILED NOV. 3, 1917.
1,285,235.
Patented Nov. 19, 1918.
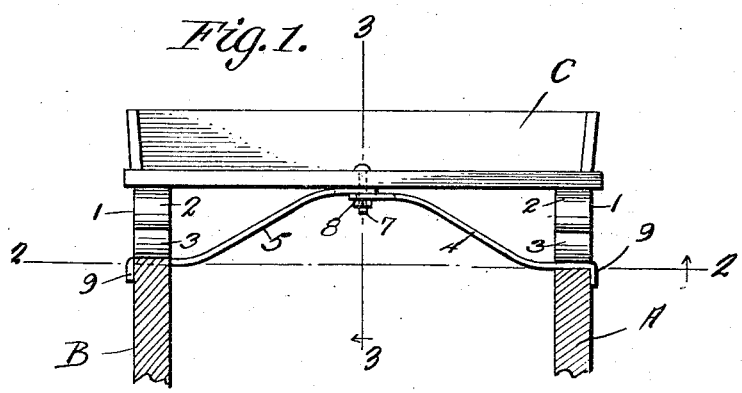
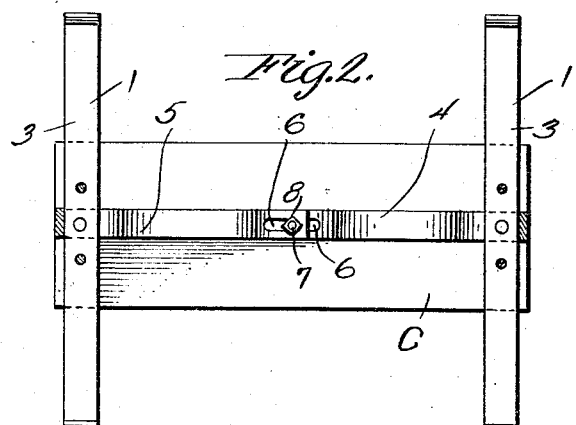
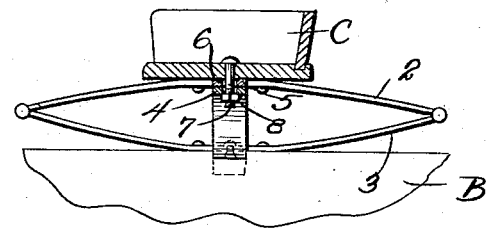
WITNESSES
Guy M. Spring
W. H. Mulligan
INVENTOR
Horace E. Knowles
BY Richard Owen.
ATTORNEY

UNITED STATES PATENT OFFICE.

HORACE E. KNOWLES, OF WELTY, OKLAHOMA.

SPRING-SEAT.

1,285,235.  Specification of Letters Patent.  Patented Nov. 19, 1918.

Application filed November 3, 1917. Serial No. 200,203.

*To all whom it may concern:*

Be it known that I, HORACE E. KNOWLES, a citizen of the United States, residing at Welty, in the county of Okfuskee and State of Oklahoma, have invented certain new and useful Improvements in Spring-Seats, of which the following is a specification.

This invention relates to wagon seats and more particularly to an improved construction for the ordinary seat generally mounted upon a wagon body.

The primary object is to provide a resilient mounting means whereby the seat may be held in position above the wagon body but so connected thereto that side swaying of the seat when the vehicle is in motion will prevent the sides of the body of the vehicle from being injured or damaged or torn or loosened in any manner.

The invention further aims at the provision of complementary spring members adapted to extend longitudinally beneath the wagon seat and to act with the side springs to maintain the seat in position at the same time permitting resiliency to be imparted to the seat so that the easy riding motion will not be prevented.

A further object of this invention is the provision of a spring seat which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a front elevation of a wagon seat mounted upon a portion of a wagon body showing the invention applied thereto.

Fig. 2 is a horizontal section taken on the line 2—2 of Fig. 1 and looking in the direction indicated by the arrow.

Fig. 3 is a vertical section taken on the line 3—3 of Fig. 1, and looking in the direction indicated by the arrow.

Referring to the drawing, wherein is illustrated the preferred form of my invention, in which like numerals of reference indicate corresponding parts throughout the several views, the vehicle body is provided with the sides A and B which support the seat C when in position. Attached to the seat are the elliptical springs 1 each of which includes the upper leaf 2 and the lower leaf 3 having their terminals joined together in the usual manner. The leaf 2 is secured to the bottom of the seat C at the end thereof while the leaf 3 is mounted upon the upper edge of the side of the body of the vehicle, the two leaves being riveted in position to firmly secure the spring to the seat. The springs 1 will permit the seat to sway from side to side when the vehicle is traveling over uneven ground. This tendency caused the sides A and B of the wagon body to become injured, damaged or loosened from their positions and the wagon quickly becomes deflective in this manner. Furthermore the occupant of the seat is constantly being swayed from side to side and the weight of the occupant in addition to the seat will tend to loosen the leaf spring from the bottom of the seat and from the edge of the wagon body.

To overcome this I have provided the complementary spring members which are two in number. Each complementary spring indicated at 4 and 5, is constructed from a flat strip of suitable material having its meeting ends overlapped beneath the center of the seat, each overlapped portion being provided with a longitudinal slot 6 for the reception of a fastening bolt 7 projecting through the bottom of the seat and secured by the nut 8. From this end each spring is bent downwardly at an angle from the bottom of the vehicle seat and is then extended straight across the side board while the terminal thereof is bent at right angles to form a retaining lip 9 for each complementary spring. This lip engages and tightly contacts with the outer portion of each side of the vehicle body, and it will be noted that when the seat C begins to sway from one side to the other, the bolt 7 will be limited in its movement in either direction by the slot 6 in either one of the complementary leaves 4 or 5. In this manner the swaying movement of the seat C will be very slight and nothing will be taken from the efficiency of the elliptical spring since the complementary springs 4 and 5 will also possess sufficient resiliency to permit them to flex when the elliptical springs are in action.

In addition to limiting the swaying movement of the seat, the slots 6 permit the ends of the complementary springs 4 and 5 to slightly move in either direction when the seat compresses the same.

From the foregoing it will be observed that a very simple and durable spring seat has been provided the details of which embody the preferred form. I desire it to be understood, however, that slight changes in the minor details of construction may be made without departing from the spirit of the invention or the scope of the claim hereunto appended.

Claim:

The combination with a wagon seat and the side boards of the wagon body, elliptical springs mounted upon the side boards and supporting the seat, in combination with a pair of resilient flat springs having their adjacent ends overlapped and attached to the center of the seat at the bottom thereof, and their opposite ends extending across the edges of the said side boards, and lips formed on the terminals of the said flat springs to engage the outer sides of the said side boards.

In testimony whereof I affix my signature in presence of two witnesses.

HORACE E. KNOWLES.

Witnesses:
J. A. SATTERWAITE,
H. G. HENDRICKS.

Copies of this patent may be obtained for five cents each, by addressing the "Commissioner of Patents, Washington, D. C."